(12) United States Patent
Shimo et al.

(10) Patent No.: US 7,426,922 B2
(45) Date of Patent: Sep. 23, 2008

(54) ENGINE EXHAUST GAS PURIFIER

(75) Inventors: Daisuke Shimo, Hiroshima (JP);
Motoshi Kataoka, Hiroshima (JP);
Masahiko Fujimoto, Hiroshima (JP);
Daisuke Fukuda, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/802,417

(22) Filed: May 22, 2007

(65) Prior Publication Data
US 2008/0022972 A1    Jan. 31, 2008

(30) Foreign Application Priority Data
Jul. 26, 2006  (JP)  .............................. 2006-203883
Jul. 26, 2006  (JP)  .............................. 2006-203884

(51) Int. Cl.
*F02M 25/07*    (2006.01)
(52) U.S. Cl. ................................. 123/568.12
(58) Field of Classification Search ............ 123/568.11, 123/568.12, 568.21, 568.31; 60/284, 285
See application file for complete search history.

(56) References Cited

U.S. PATENT DOCUMENTS

| | | | |
|---|---|---|---|
| 5,845,492 A * | 12/1998 | Isobe et al. ................... | 60/284 |
| 6,729,303 B2 * | 5/2004 | Itoyama et al. ............... | 123/478 |
| 6,981,369 B2 * | 1/2006 | Miura .......................... | 60/285 |
| 2003/0230276 A1 * | 12/2003 | Kataoka et al. ............. | 123/295 |
| 2004/0103860 A1 * | 6/2004 | zur Loye et al. .......... | 123/27 R |

FOREIGN PATENT DOCUMENTS

JP    2001-082233    3/2001

* cited by examiner

*Primary Examiner*—Thomas N Moulis
(74) *Attorney, Agent, or Firm*—Studebaker & Brackett PC; Donald R. Studebaker

(57) ABSTRACT

An engine exhaust gas purifier includes: an injection controller allowing a fuel injection valve to inject fuel near the top dead center on each compression stroke; an EGR amount controller for controlling the amount of exhaust gas recirculated into a combustion chamber; an excess air ratio controller for controlling the excess air ratio so that the local equivalence ratio in a late combustion stage is lower than the equivalence ratio at which soot is produced; and an intake air temperature controller for controlling the temperature of intake air after being mixed with exhaust gas. The intake air temperature controller controls the temperature of intake air within a temperature range lower than an upper temperature limit below which a predetermined ignition delay time can be secured and higher than a lower temperature limit above which the production of HC and CO can be avoided.

7 Claims, 7 Drawing Sheets

ENGINE EXHAUST GAS PURIFIER

BACKGROUND OF THE INVENTION (a) Field of the Invention

This invention relates to exhaust gas purifiers for diesel engines.

(b) Description of the Related Art

One of technical challenges for diesel combustion is to significantly reduce NOx and soot while maintaining good fuel economy. There is a known diesel combustion system capable of significantly reducing both of NOx and soot by recirculating a large amount of exhaust gas by EGR to reduce the combustion temperature and by injecting fuel relatively early for well mixture with air and causing the premixture to autoignite at the end of every compression stroke (see, for example, Published Japanese Patent Application No. 2001-82233).

On the other hand, an ideal combustion condition from the aspect of fuel economy is to accurately control the ignition timing to near the top dead center on each compression stroke in order to minimize the total sum of time loss, cooling loss and mechanical loss. According to the combustion system as described in the published document, however, a significant advance of the fuel ignition timing provides a very long ignition delay. Therefore, even if the fuel injection timing is changed to some extent, the ignition timing cannot be changed. Alternatively, if an attempt is made to control the ignition timing to near the top dead center on each compression stroke by increasing the amount of EGR to further extend the ignition delay time, this causes lack of oxygen to significantly increase HC and CO and thereby deteriorate the fuel economy. As a result, the combustion system as described in the published document cannot control the ignition timing to an appropriate timing.

SUMMARY OF THE INVENTION

The present invention has been made in view of the foregoing points and, therefore, its object is to provide a diesel engine that concurrently enables low emission and improved fuel economy.

To attain the above object, according to the present invention, the temperature of intake air after being mixed with exhaust gas is controlled to an appropriate temperature.

According to a first aspect of the present invention, an exhaust gas purifier for an engine includes: an injection controller allowing a fuel injection valve presented to a combustion chamber of the engine to inject a predetermined amount of fuel near the top dead center on each compression stroke; an EGR amount controller for controlling the amount of exhaust gas recirculated into the combustion chamber so that a high-temperature part of a combustion air-fuel mixture has a lower temperature than the temperature at which NOx is produced; an excess air ratio controller for controlling the excess air ratio in the combustion chamber so that the local equivalence ratio in a late combustion stage is lower than the equivalence ratio at which soot is produced; and an intake air temperature controller for controlling the temperature of intake air after being mixed with exhaust gas and before being supplied into the combustion chamber within a temperature range lower than an upper temperature limit below which a predetermined ignition delay time can be secured after fuel injection of the fuel injection valve and higher than a lower temperature limit above which the production of HC and CO can be avoided.

With this configuration, by the exhaust gas recirculation of the EGR amount controller, a high-temperature part (local temperature) of a combustion air-fuel mixture is reduced to a lower temperature than the temperature at which NOx is produced. Thus, the production of NOx can be reduced.

Furthermore, by the intake air temperature control of the intake air temperature controller (intake air cooling) and the exhaust gas recirculation described above, a predetermined ignition delay time can be secured. Thus, fuel and air are well mixed with each other to restrain the production of soot. Note that the term "ignition" as employed herein means hot flame ignition in which a rapid heat release occurs. Furthermore, by increasing the intake air density owing to the intake air cooling described above and concurrently by maintaining the excess air ratio in the combustion chamber at a relatively high level under the control of the excess air ratio controller, soot produced in each middle combustion stage can be oxidized in the late combustion stage. Thus, soot emission can be reduced.

Furthermore, by increasing the intake air density owing to the intake air cooling and maintaining the excess air ratio in the combustion chamber at a relatively high level, the air-fuel mixture can be prevented from being placed under a locally low-temperature and over-concentration condition in each late combustion stage. Thus, the production of HC and CO can be reduced.

In the combustion system according to the first aspect of the invention, soot reduction is provided by the combined effects of intake air cooling and exhaust gas recirculation. This eliminates the need to excessively delay the ignition timing, which enables the setting of the fuel injection timing to near the top dead center on each compression stroke. As a result, the ignition timing can be accurately controlled to near the top dead center on each compression stroke, thereby improving the fuel economy.

Note that with this combustion system, it is impossible to secure a predetermined ignition delay time even by the intake air cooling if the amount of fuel injected at high engine loads increases over a specified amount. Therefore, this combustion system is practicable in a partial engine load region. According to this combustion system, however, the ignition timing can be controlled while the fuel injection timing is selected to near the top dead center on each compression stroke. Therefore, when this combustion system is carried out at the transition of the combustion mode, the ignition timing can be appropriately selected to near the top dead center on each compression stroke, thereby providing, for example, the advantage of preventing increase in combustion noise.

The intake air temperature controller is preferably configured, when the engine load is relatively high, to change the upper and lower temperature limits to lower values than when the engine load is relatively low.

When the engine load is relatively high and the amount of fuel injected is relatively large accordingly, the upper and lower temperature limits are lowered to lower the intake air temperature. Thus, the ignition delay time can be extended to reduce the production of soot.

As the engine load increases, the intake air temperature controller may decrease the upper and lower temperature limits and make the rate of decrease in the lower temperature limit to the engine load smaller than the rate of decrease in the upper temperature limit to the engine load.

Thus, the intake air temperature is made appropriate for the engine load, which restrains the emission of soot, HC and CO.

The injection controller may be configured, when the engine load is a predetermined value or more, to allow the fuel injection valve to provide a pilot injection of a predetermined amount of fuel at a predetermined injection timing prior to the fuel injection near the top dead center on the compression stroke.

When the engine load is a predetermined value or more and the required amount of fuel to be injected is relatively large accordingly, a fuel injection is carried out in twice: a pilot injection and a main injection (i.e., the fuel injection near the top dead center on the compression stroke).

If a large amount of fuel is injected in one near the top dead center on the compression stroke, a sufficient mixing time cannot be secured, resulting in the production of soot. In contrast, when a fuel injection is carried out in a split manner, a pilot fuel injection provides an extended mixing time and the reduction of the amount of fuel injected during the main injection advances the end of the main injection. As a result of these effects, a sufficient mixing time can be secured. Therefore, as described above, soot emission can be reduced.

In other words, by switching the fuel injection between a single injection mode for performing only a main injection and a split injection mode for performing pilot and main injections according to the engine load, the applicable scope of the combustion system according to the first aspect of the invention can be widened to higher engine loads.

Preferably, the pilot injection is controlled so that fuel injected during the pilot injection cannot autoignite and the ignition timing is controlled to near the top dead center on the compression stroke by the main injection.

The injection controller preferably controls the injection timing of the pilot injection within the range of crank angles later than a timing limit ahead of which fuel injected during the pilot injection is left unburned and earlier than a timing limit ahead of which a predetermined mixing time can be secured after the pilot injection.

If the pilot injection timing is too early (for example, earlier than BTDC 40° CA), injected fuel strikes the cylinder liner, for example, and is thereby left unburned, which is disadvantageous in fuel economy. On the other hand, if the pilot injection timing is too late (for example, later than BTDC 35° CA), the predetermined mixing time after the pilot injection cannot be secured. Therefore, it is preferable to control the injection timing of the pilot injection within the range of crank angles later than the timing limit ahead of which fuel injected during the pilot injection is left unburned and earlier than the timing limit ahead of which the predetermined mixing time can be secured after the pilot injection.

When the engine load is relatively high, the injection controller preferably controls the amount of fuel injected during the pilot injection at a larger value than when the engine load is relatively low.

When the engine load is relatively high and the amount of fuel injected is relatively large accordingly, the amount of fuel injected during the pilot injection is increased and the amount of fuel injected during the main injection is reduced correspondingly. Thus, the predetermined mixing time can be secured.

According to a second aspect of the present invention, an engine exhaust gas purifier includes an engine including at least one combustion chamber, a fuel injection valve for injecting a predetermined amount of fuel into the combustion chamber near the top dead center on each compression stroke, and a control unit for controlling the combustion system in the combustion chamber.

The control unit controls the amount of exhaust gas recirculated into the combustion chamber so that a locally high-temperature part of a combustion air-fuel mixture has a lower temperature than the temperature at which NOx is produced, controls the excess air ratio in the combustion chamber so that the local equivalence ratio in a late combustion stage is lower than the equivalence ratio at which soot is produced, and controls the temperature of intake air after being mixed with exhaust gas and before being supplied into the combustion chamber within a temperature range lower than an upper temperature limit below which a predetermined ignition delay time can be secured after the fuel injection and higher than a lower temperature limit above which the production of HC and CO can be avoided.

DETAILED DESCRIPTION OF THE INVENTION

Figure 1:
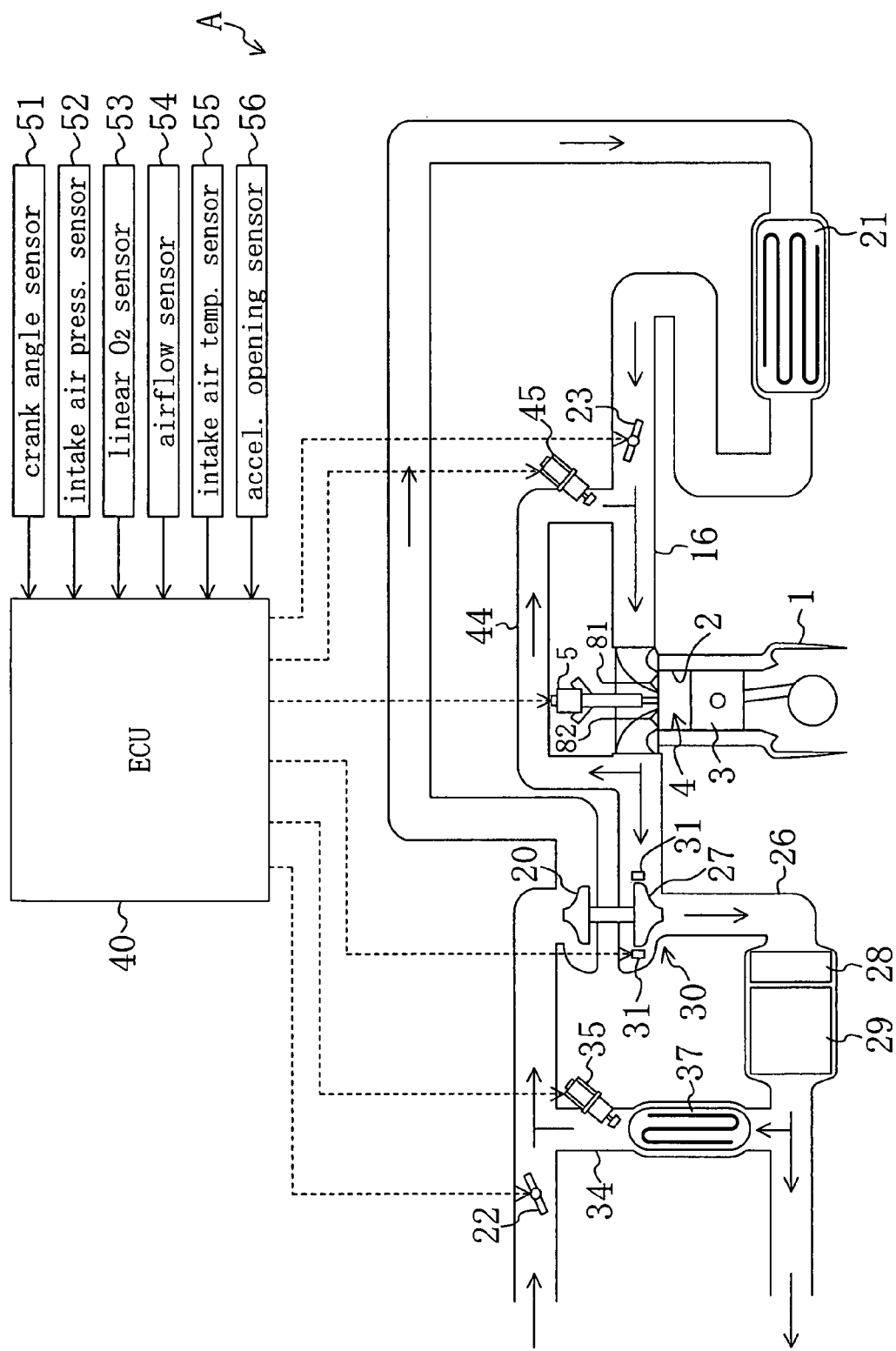
FIG. 1 is a diagram showing an entire configuration of an engine exhaust gas purifier according to an embodiment of the present invention.

A description is given below of embodiments of the present invention with reference to the drawings. FIG. 1 shows an example of an engine exhaust gas purifier A according to an embodiment of the present invention. In the figure, reference numeral 1 denotes a diesel engine mounted on a vehicle. The engine 1 includes a plurality of cylinders 2, 2, ... (only one is shown in the figure). Each cylinder 2 contains a piston 3 reciprocably fitted therein. The piston 3 defines a combustion chamber 4 in the associated cylinder 2. The combustion chamber 4 is provided at the top with an injector (fuel injection valve) 5. High-pressure fuel is injected from a nozzle at the tip of the injector 5 directly into the associated combustion chamber 4.

Although not shown in FIG. 1, the structure for supplying fuel to the injector 5 in each cylinder 2 is of the so-called common rail type that includes a common fuel distribution pipe (common rail) connected with all the injectors 5. The fuel pressure in the common rail (the common rail pressure) is controlled by a later-described electronic control unit (ECU) 40 that inputs output signals from a fuel pressure sensor for detecting the common rail pressure.

Although not shown in FIG. 1, the engine 1 is provided at the top with a valve actuating mechanism for controlling the opening and closing of each of an intake valve 81 and an exhaust valve 82.

A lateral side (right side in FIG. 1) of the engine 1 is connected to an intake passage 16 for supplying, into the combustion chamber 4 in each cylinder 2, air filtered in an unshown air cleaner (fresh air). The intake passage 16 is provided, in order from upstream to downstream, with an intake air throttle valve 22 composed of a butterfly valve, a compressor 20 capable of being activated by a later-described turbine 27 to compress intake air, an intercooler 21 for cooling the intake air compressed by the compressor 20, and an intercooler (I/C) path throttle valve 23 composed of a butterfly valve.

The opposite lateral side (left side in FIG. 1) of the engine 1 is connected to an exhaust passage 26 for exhausting combustion gas (exhaust gas) from the combustion chamber 4 in each cylinder 2. The upstream end of the exhaust passage 26 constitutes an exhaust manifold that branches into the plurality of cylinders 2 and communicates with their respective combustion chambers 4 through their respective exhaust ports. Downstream of the exhaust manifold, the exhaust passage 26 is provided, in order from upstream to downstream, with the turbine 27 rotatable by the exhaust gas flow, a diesel oxidation catalyst 28 and a catalyzed diesel particulate filter (DPF) 29 capable of converting harmful substances (such as HC, CO, NOx and soot) in the exhaust gas.

The turbine 27 in the exhaust passage 26 and the compressor 20 in the intake passage 16 constitute a turbosupercharger 30. In this embodiment, the turbosupercharger 30 is a variable geometry turbosupercharger (hereinafter, referred to as a VGT) capable of changing the cross-sectional area of the exhaust gas flow towards the turbine 27 with movable flaps 31, 31, . . . . The VGT 30 is controlled by the electronic control unit (ECU) 40 to control the supercharging pressure for intake air.

The exhaust passage 26 is connected downstream of the catalyzed DPF 29 to the upstream end of a first exhaust gas recirculation passage (hereinafter, referred to as a first EGR passage) 34 for recirculating part of the exhaust gas to the intake passage 16. The downstream end of the first EGR passage 34 is connected to the intake passage 16 between the intake air throttle valve 22 and the compressor 20. Furthermore, the first EGR passage 34 is provided partway with an EGR cooler 37 for cooling exhaust gas flowing through the EGR passage 34 and an exhaust gas recirculation control valve (hereinafter, referred to as a first EGR valve) 35 whose opening can be controlled.

The exhaust manifold is connected to the upstream end of a second exhaust gas recirculation passage (hereinafter, referred to as a second EGR passage) 44. The downstream end of the second EGR passage 44 is connected to the intake passage 16 downstream of the intercooler 21 (more properly, downstream of the I/C pass throttle valve 23). Furthermore, the second EGR passage 44 is provided partway with a second exhaust gas recirculation control valve (hereinafter, referred to as a second EGR valve) 45 whose opening can be controlled.

Each injector 5, the intake air throttle valve 22, the I/C path throttle valve 23, the VGT 30 and the first and second EGR valves 35 and 45 are actuated according to control signals from the electronic control unit (hereinafter, referred to as the ECU) 40. The ECU 40 inputs at least output signals from a crank angle sensor 51 for detecting the rotational angle of the crankshaft of the engine 1, an intake air pressure sensor 52 for detecting the pressure condition of intake air, a linear $O_2$ sensor 53 for detecting the oxygen concentration in exhaust gas, an airflow sensor 54 for detecting the flow rate of air taken from outside into the engine 1, an intake air temperature sensor 55 for detecting the temperature of intake air after being mixed with EGR gas and an accelerator opening sensor 56 for detecting the stepping-on measurement of an unshown accelerator pedal (the accelerator opening).

For the purpose of basic control over the engine 1, the ECU 40 determines a basic target amount of fuel injected based on the detected accelerator opening and controls the actuation of each injector 5 to control the amount of fuel injected and the fuel injection timing. Furthermore, the ECU 40 controls the openings of the intake air throttle valve 22 and the first EGR valve 35 to control the proportion of exhaust gas recirculation into the combustion chamber 4, and controls the actuation of the flaps 31, 31, . . . of the VGT 30 (performs VGT control) to enhance the supercharge efficiency of intake air.

In this embodiment, the ECU 40 also controls the openings of the first and second EGR valves 35 and 45 to control the temperature of intake air after being mixed with EGR gas.

Figure 2:
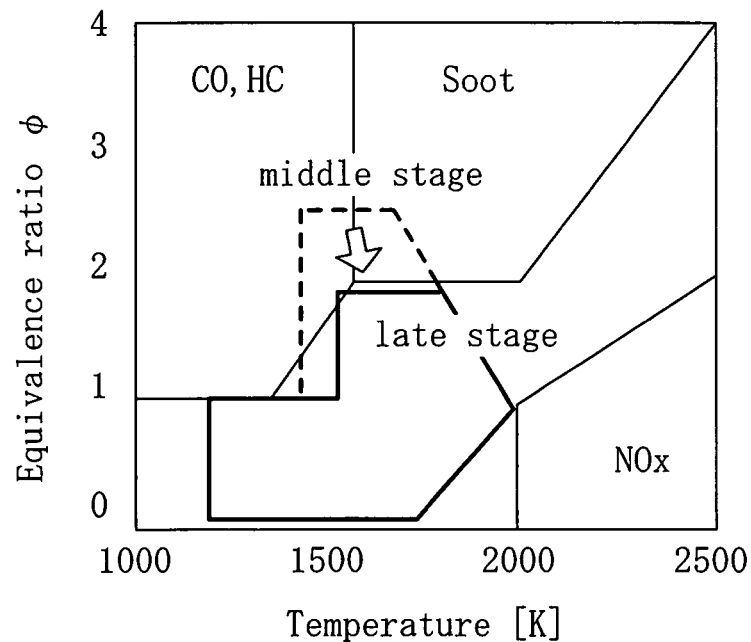
FIG. 2 is a $\phi$-T map showing a combustion system according to the present invention.

A description is given here of a combustion system accomplished under the control of the ECU 40 with reference to a local equivalence ratio-local temperature map ($\phi$-T map) shown in FIG. 2. The $\phi$-T map shows a HC and CO production zone, a soot production zone and a NOx production zone, wherein local equivalence ratio $\phi$ is plotted against local temperature T. According to this combustion system, as shown in the bold solid line in the figure, a large amount of exhaust gas is recirculated by EGR to decrease the local temperature and thereby restrain the production of NOx. Furthermore, the intake air supplied to the combustion chamber 4 is cooled to increase its density and thereby provides a high excess air ratio. This avoids a locally low-temperature (T<1500K) and over-concentration ($\phi$>1) condition and thereby restrains the production of HC and CO.

Furthermore, the intake air cooling and EGR provide a secured ignition delay to restrain the production of soot and a high excess air ratio is maintained to oxidize, in a late combustion stage, soot produced in a middle combustion stage. Specifically, according to this combustion system, although the engine operating condition temporarily enters the soot production zone in the middle combustion stage, the oxidation of soot is promoted therein because of the relatively high excess air ratio and a surplus amount of oxygen in the late combustion stage. At the end of combustion, the engine operating condition exits from the soot production zone (see the unfilled arrow in FIG. 2).

According to this combustion system, the soot emission is reduced without the need to excessively extend the ignition delay time. Therefore, although described later in detail, the fuel ignition timing is selected from within a predetermined range (BTDC 15° CA to 10° CA). Since, thus, the fuel injection timing can be selected to near the top dead center on each compression stroke, the ignition timing can be accurately controlled to near the top dead center on each compression stroke. Hereinafter, this combustion system is referred to as an "EGR cooling combustion".

Next, a description is given of a specific control for achieving the EGR cooling combustion with reference to FIGS. 3 to 9. In this case, the ECU 40 controls the first and second EGR valves 35 and 45, the intake air throttle valve 22 and the VGT 30 to control the intake air temperature, the $O_2$ concentration in intake air and the excess air ratio within their respective predetermined ranges.

Figure 3:
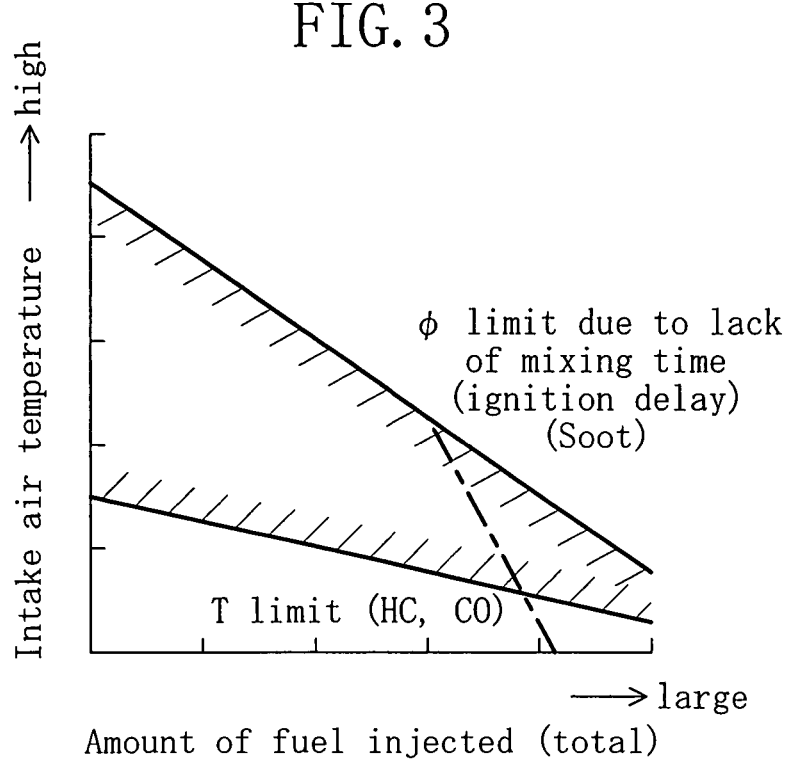
FIG. 3 illustrates an example of an intake air temperature map.

First of all, the control over the intake air temperature is implemented by controlling the first and second EGR valves 35 and 45 according to the map shown in FIG. 3. Specifically, the ECU 40 controls the first and second EGR valves 35 and 45 to regulate the amount of EGR gas flowing through the EGR cooler 37 and the amount of EGR gas not flowing through the EGR cooler 37, thereby controlling the temperature of intake air after being mixed with the EGR gas.

The map shown in FIG. 3 plots the intake air temperature range relative to the amount of fuel injected (i.e., engine load). Each upper limit on the map indicates a temperature limit below which a predetermined ignition delay time can be secured (wherein the limit is determined by a limit of local equivalence ratio required to restrain the production of soot). On the other hand, each lower limit on the map indicates a temperature limit above which the production of HC and CO can be avoided (wherein the limit is determined by a local temperature limit required to restrain the production of HC and CO). The upper and lower limits are set to decrease as the amount of fuel injected increases, in other words, as the engine load increases. This is because higher amount of fuel injected will require to cool the intake air more and thereby extend the ignition delay time further. The rate of decrease in the lower limit to the amount of fuel injected is set to be smaller than that in the upper limit to the amount of fuel injected. In other words, the gradient of the line showing the set of lower limits on the map is smaller than that of the line showing the set of upper limits. The difference between the rate of decrease in the upper limit and the rate of decrease in the lower limit is owing to the difference between the factor determining the upper limit and the factor determining the lower limit.

Figure 4:
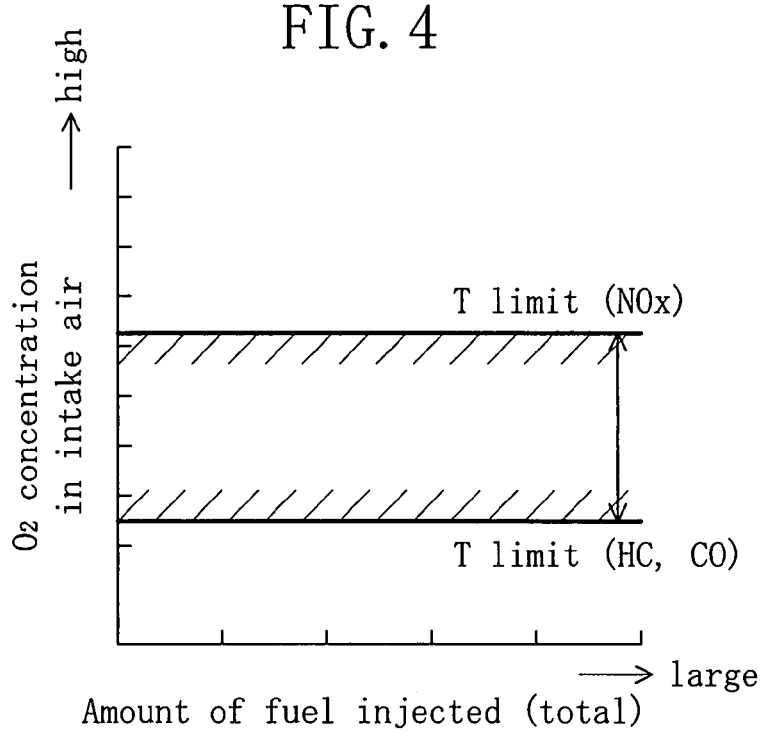
FIG. 4 illustrates an example of an intake air $O_2$ concentration map.

Next, the control over the $O_2$ concentration in intake air is implemented by controlling the first EGR valve 35 and the intake air throttle valve 22 according to the map shown in FIG. 4.

The map shown in FIG. 4 plots the range of $O_2$ concentrations relative to the amount of fuel injected. The upper limit on the map indicates an $O_2$ concentration limit required to avoid the production of NOx (wherein the limit is determined by a local temperature limit required to restrain the production of NOx). On the other hand, the lower limit on the map indicates an $O_2$ concentration limit required to avoid the production of HC and CO (wherein the limit is determined by a local temperature limit required to restrain the production of HC and CO). The upper and lower limits are set at fixed values irrespective of the amount of fuel injected. In this case, for example, the upper limit is preferably 12.5 vol % and the lower limit is preferably 11 vol %. These values were obtained from experiments.

Figure 5:
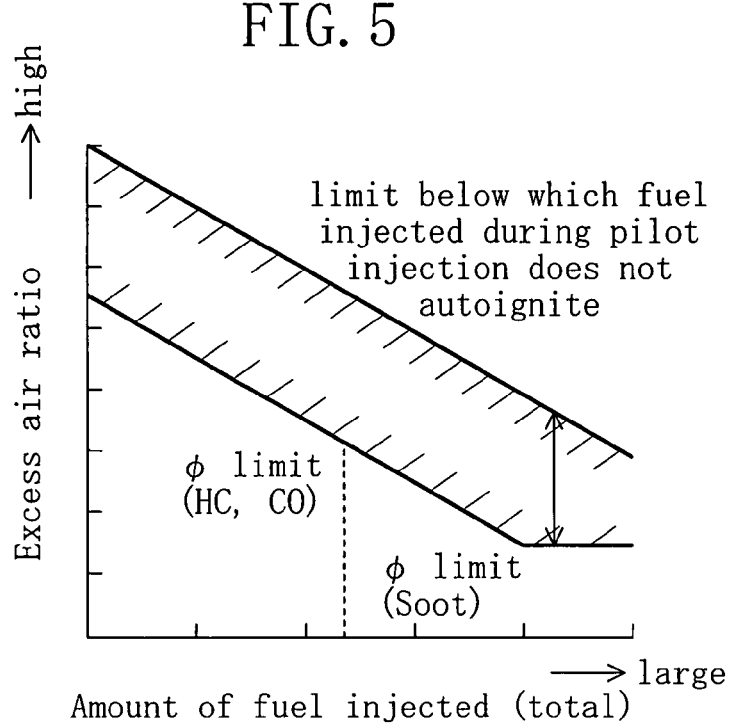
FIG. 5 illustrates an example of an excess air ratio map.

Next, the control over the excess air ratio is implemented by controlling the VGT 30 according to the map shown in FIG. 5.

The map shown in FIG. 5 plots the range of excess air ratios relative to the amount of fuel injected. Each upper limit on the map indicates a limit below which fuel injected during a later-described pilot injection does not autoignite. On the other hand, each lower limit at relatively low engine loads on the map indicates a limit required to restrain the production of HC and CO (wherein the limit is determined by a limit of local equivalence ratio required to restrain the production of HC and CO) and each lower limit at relatively high engine loads on the map indicates a limit required to restrain the production of NOx (wherein the limit is determined by a limit of local equivalence ratio required to restrain the production of NOx).

Furthermore, in this embodiment, the ECU 40 controls to switch the fuel injection of the injector 5 between a single injection mode for injecting fuel in one and a split injection mode for injecting fuel in twice depending upon the engine load (the amount of fuel injected). Thus, the applicable scope of EGR cooling combustion can be widened to higher engine loads.

Specifically, in injecting a whole amount of fuel not in the split injection mode but in one, a sufficient mixing time will not be secured for a large amount of fuel injected, which prevents the production of soot from being reduced (in other words, as shown in the dash-single-dot line in FIG. 3, the upper limit of intake air temperature becomes lower than the lower limit thereof, which cannot provide EGR cooling combustion). To avoid this, the split injection mode is selected in which a small amount of fuel is injected in a relatively early stage (pilot injection) and the remaining fuel is injected near the top dead center on the compression stroke (main injection). Thus, it takes a long time before the fuel ignites after the pilot injection and the end of main injection comes earlier. Therefore, even for a large amount of fuel injected, a sufficient mixing time can be secured and the EGR cooling combustion can be provided. Note that fuel injected during the pilot injection is controlled to avoid its autoignition and the ignition timing is controlled according to the main injection timing.

Figure 6:
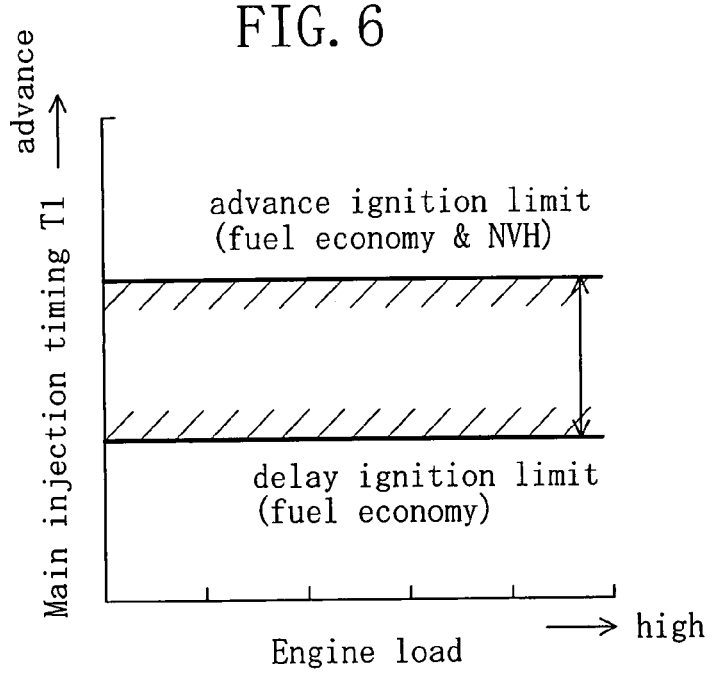
FIG. 6 illustrates an example of a main injection timing map.

In the split injection mode, the main injection timing (the start timing of a main injection) T1 is selected according to the map shown in FIG. 6. For example, the upper limit of injection timing is preferably selected at BTDC 15° CA and the lower limit thereof is preferably selected at BTDC 10° CA.

Figure 7:
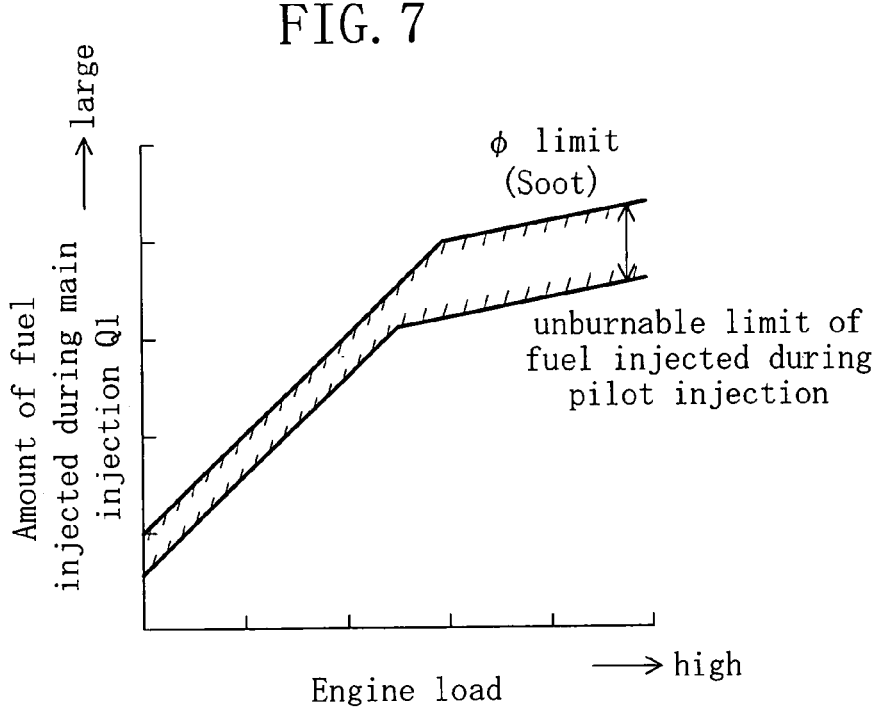
FIG. 7 illustrates an example of a main injection amount map.

Furthermore, the amount of fuel injected during main injection Q1 is selected according to the map shown in FIG. 7. Each upper limit on the map indicates a limit of the amount of fuel injected during main injection below which a predetermined ignition delay time can be secured and each lower limit indicates a limit of the amount of fuel injected during main injection determined by an upper limit of the amount of fuel injected during pilot injection. Note that, as described later, the amount of fuel injected during pilot injection is restricted to prevent the fuel injected during pilot injection from striking the cylinder liner and thereby being left unburned.

Figure 8:
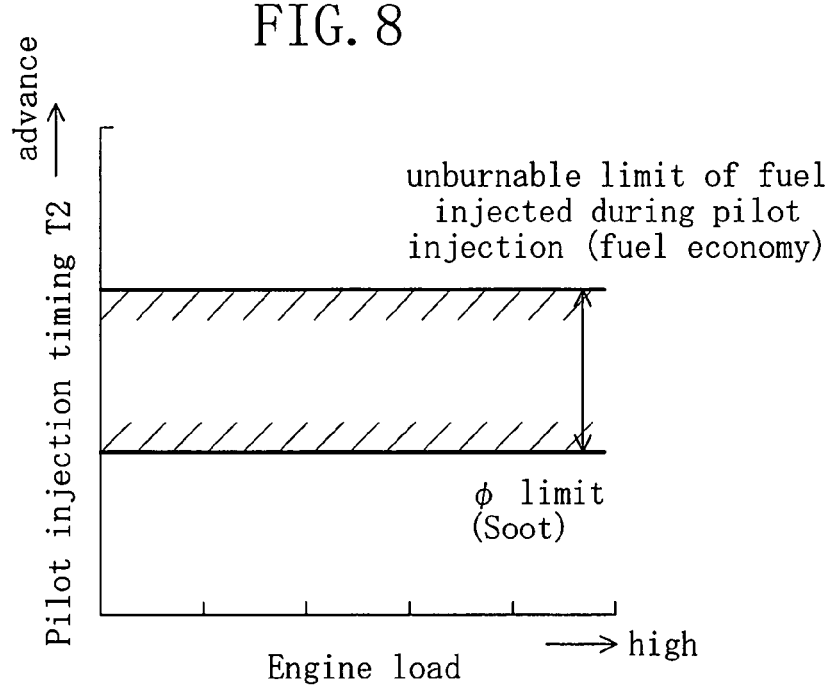
FIG. 8 illustrates an example of a pilot injection timing map.

On the other hand, the pilot injection timing (the start timing of a pilot injection) T2 is selected according to the map shown in FIG. 8. The upper limit on the map indicates the advance limit of pilot injection timing below which the fuel injected during pilot injection can be prevented from striking the cylinder liner and thereby being left unburned (in other words, the advance limit determined in consideration of fuel economy). The lower limit on the map indicates the delay limit of pilot injection timing above which a predetermined ignition delay time after the pilot injection can be secured. For example, the upper limit of pilot ignition timing is preferably selected at BTDC 40° CA and the lower limit thereof is preferably selected at BTDC 35° CA. In order to provide good atomization, a certain time interval is recommended between pilot and main injection timings.

Figure 9:
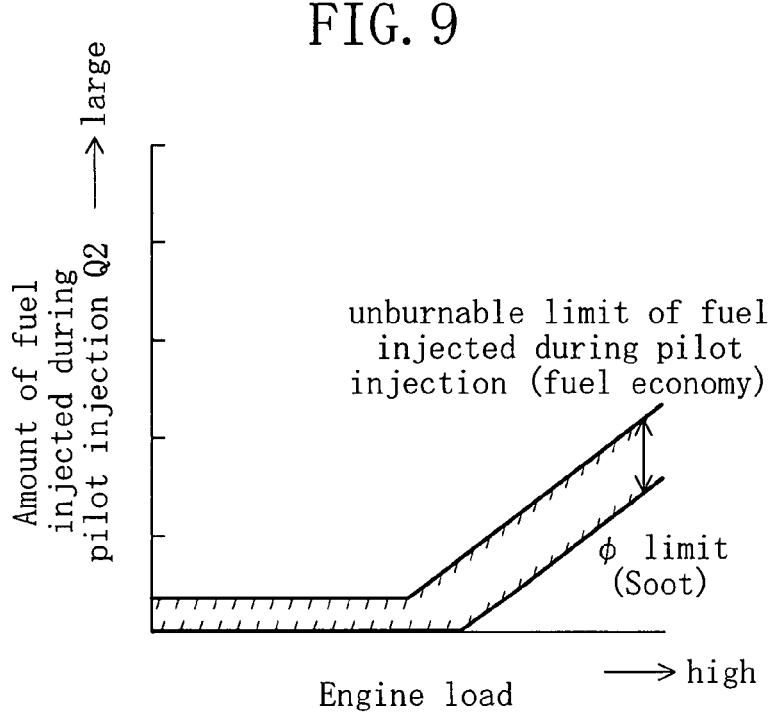
FIG. 9 illustrates an example of a pilot injection amount map.

Furthermore, the amount of fuel injected during pilot injection Q2 is selected according to the map shown in FIG. 9. Each upper limit on the map indicates a limit of the amount of fuel injected during pilot injection below which the fuel injected during pilot injection can be prevented from striking the cylinder liner and thereby being left unburned. Each lower limit on the map indicates a limit of the amount of fuel injected during pilot injection required to perform a main injection so that a predetermined ignition delay time can be secured. Namely, if the amount of fuel injected during pilot injection is too small, the effects of split injection cannot be obtained. Furthermore, the upper and lower limits are set to increase as the engine load increases. The reason for this is that as the engine load is higher and the total amount of fuel injected, which is the sum of the amount of fuel injected during main injection and the amount of fuel injected during pilot injection, is larger, the amount of fuel injected during pilot injection is increased and the amount of fuel injected during main injection is relatively reduced, thereby providing a sufficient mixing time.

Figure 10:
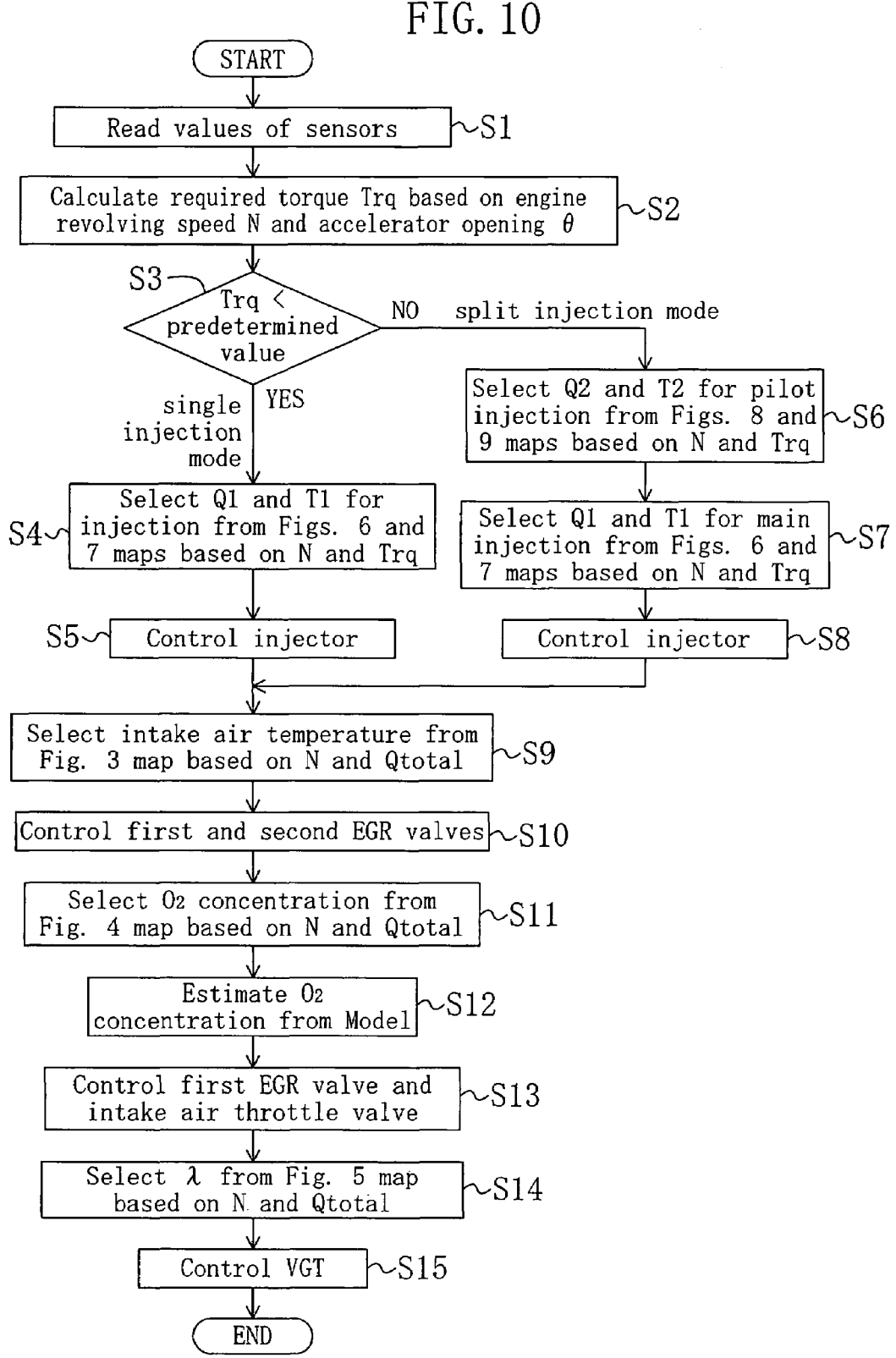
FIG. 10 is a flowchart showing a control procedure of EGR cooling combustion.

Next, a description is given of the control of the ECU 40 for EGR cooling combustion with reference to the flowchart shown in FIG. 10.

First, in step S1, data from the sensors 51 to 56 are read. Next, based on the engine revolving speed N and accelerator opening θ read in step S1, the required torque Trq is calculated in step S2 according to a map (not shown) stored in advance in the ECU 40. Note that the map on the required torque is configured so that the required torque increases as the accelerator opening is larger or as the engine revolving speed is higher. Also note that in the following steps the combustion mode of the engine 1 is the mode of performing the EGR cooling combustion described above based on the calculated required torque Trq.

In step S3, it is determined whether the required torque Trq calculated in step S2 is smaller than a predetermined value. If YES, i.e., the required torque Trq is smaller than the predetermined value, the flow goes to step S4. If NO, i.e., the required torque Trq is equal to or larger than the predetermined value, the flow goes to step S6.

Steps S4 and S5 relates to the single injection mode where a fuel injection is performed in one. First, based on the engine revolving speed N and required torque Trq, the amount of fuel injected Q1 and the injection timing T1 are determined in step S4 according to the maps shown in FIGS. 6 and 7, respectively. Next, in step S5, the injector 5 injects fuel with the determined amount of fuel injected Q1 at the determined injection timing T1.

On the other hand, steps S6 to S8 relates to the split injection mode where a fuel injection is performed in twice. First, based on the engine revolving speed N and required torque Trq, the amount of fuel injected Q2 during pilot injection and the pilot injection timing T2 are determined in step S6 according to the maps shown in FIGS. 8 and 9, respectively. Next, in step S7, the amount of fuel injected Q1 during main injection and the main injection timing T1 are determined according to the maps shown in FIGS. 6 and 7, respectively. Then, in step S8, the injector 5 performs a pilot fuel injection with the determined amount of fuel injected Q2 at the determined injection timing T2 and then performs a main fuel injection with the determined amount of fuel injected Q1 at the determined injection timing T1.

In step S9, based on the engine revolving speed N and the total amount of fuel injected Qtotal (Q1 in the single injection mode or Q1+Q2 in the split injection mode), a target intake air temperature is selected according to the map shown in FIG. 3. Next, in step S10, each of the first and second EGR valves 35 and 36 is controlled to provide the selected target intake air temperature.

In step S11, based on the engine revolving speed N and the total amount of fuel injected Qtotal, a target oxygen concentration in intake air is selected according to the map shown in FIG. 4. Next, in step S12, the oxygen concentration in intake air is estimated based on a preset model. Then, in step S13, based on the target oxygen concentration selected in step S11 and the oxygen concentration estimated in step S12, each of the first EGR valve 35 and the intake air throttle valve 22 is controlled so that the actual oxygen concentration reaches the target value.

In step S14, based on the engine revolving speed N and the total amount of fuel injected Qtotal, a target excess air ratio λ is selected according to the map shown in FIG. 5. Next, in step S15, the VGT 30 is controlled to provide the selected target excess air ratio λ.

As described so far, the engine exhaust gas purifier A according to this embodiment recirculates a large amount of exhaust gas by EGR to decrease the local temperature and thereby restrain the production of NOx. Furthermore, the exhaust gas purifier A cools intake air to be supplied into the combustion chamber 4 to increase its density and thereby provide a high excess air ratio, which avoids a locally low-temperature (T<1500K) and over-concentration (φ>1) condition to restrain the production of HC and CO.

Furthermore, the exhaust gas purifier A ensures a necessary ignition delay time by intake air cooling and EGR both described above to restrain the production of soot and maintains a high excess air ratio to oxidize, in the late combustion stage, soot produced in the middle combustion stage, and thereby prevents soot emission.

Thus, according to the exhaust gas purifier A, soot emission is restrained without the need to excessively extend the ignition delay time. Therefore, the fuel injection timing (main injection timing) can be set to near the top dead center on each compression stroke, thereby providing an accurate control of the ignition timing to near the top dead center on each compression stroke. As a result, the exhaust gas purifier A concurrently provides low emission and improved fuel economy.

Furthermore, according to the exhaust gas purifier A, the applicable scope of EGR cooling combustion can be widened to higher engine loads by switching the fuel injection between the single injection mode and the split injection mode depending upon the engine load.

Figure 11:
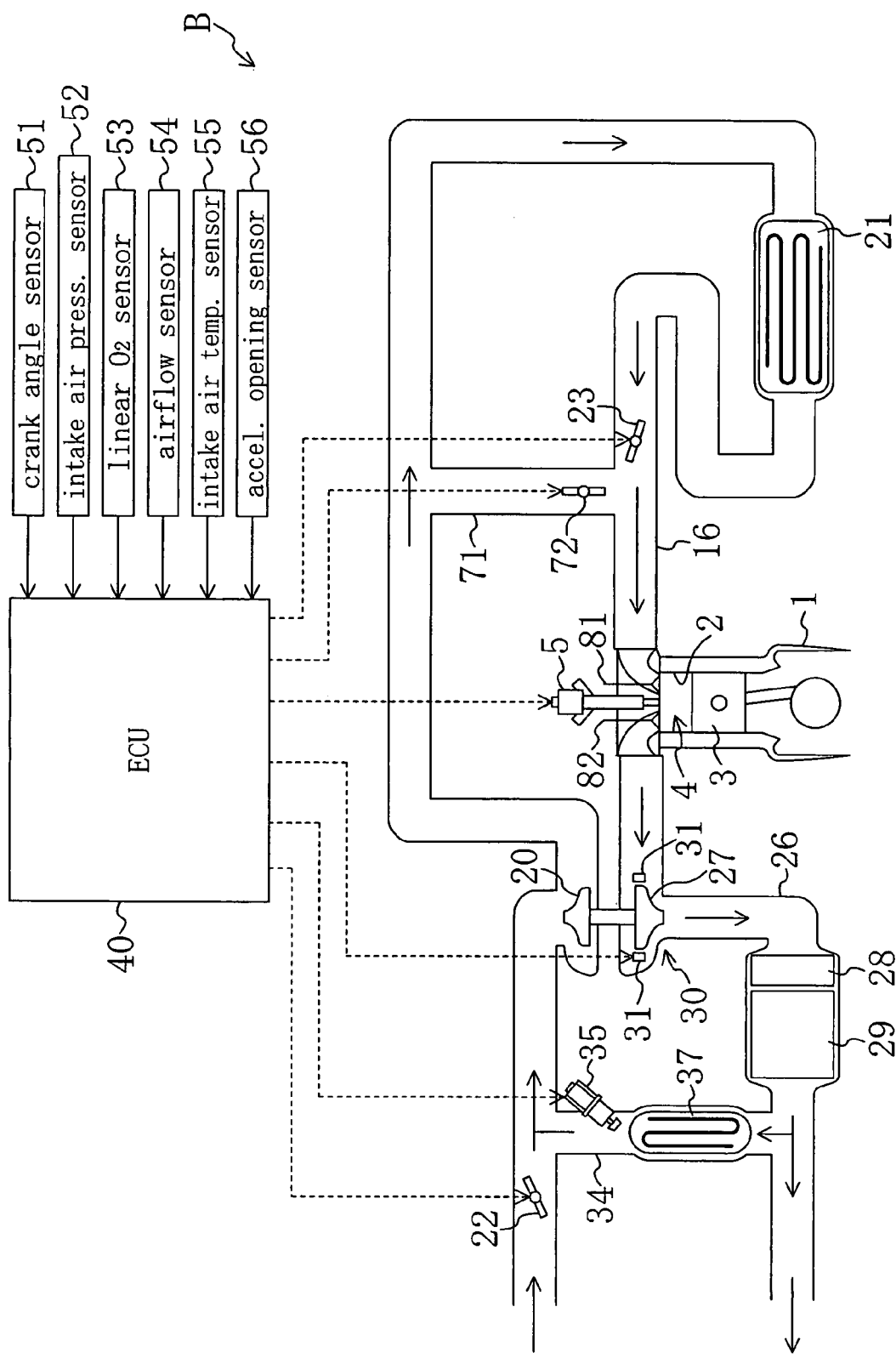
FIG. 11 is a diagram showing an entire configuration of an engine exhaust gas purifier according to another embodiment of the present invention.

The present invention is not limited to the configuration of the engine exhaust gas purifier A shown in FIG. 1 and is applicable to other configurations. For example, the present invention is applicable to the configuration of an engine exhaust gas purifier B shown in FIG. 11. The engine exhaust gas purifier B shown in FIG. 11 includes, instead of the second EGR passage 44, a bypass passage 71 that connects a part of the intake passage 16 downstream of the compressor 20 to a part thereof downstream of the intercooler 21 (more properly, downstream of the I/C pass throttle valve 23) to bypass the intercooler 21. The bypass passage 71 is provided partway with a bypass valve 72 composed of a butterfly valve.

According to the exhaust gas purifier B, the ECU 40 controls, instead of the second EGR 45, the bypass valve 72 in the flowchart shown in FIG. 10. This provides regulation of the amount of intake air flowing through the intercooler 21 and the amount of intake air not flowing through the intercooler 21. As a result, the intake air temperature can be controlled, thereby providing the EGR cooling combustion described above.

The present invention is not limited to the above embodiments but can be implemented in various forms without departing from its spirit and essential characteristics. The above embodiments should therefore be considered in all respects as illustrative only but not restrictive. The scope of the invention is indicated by the claims but not at all restricted to the description. Furthermore, all modifications and changes which come within the range of equivalents of the claims are intended to be embraced within the scope of the invention.

What is claimed is:

1. An exhaust gas purifier for an engine comprising:
    an injection controller allowing a fuel injection valve presented to a combustion chamber of the engine to inject a predetermined amount of fuel near the top dead center on each compression stroke;
    an EGR amount controller for controlling the amount of exhaust gas recirculated into the combustion chamber so that a high-temperature part of a combustion air-fuel mixture has a lower temperature than the temperature at which NOx is produced;

an excess air ratio controller for controlling the excess air ratio in the combustion chamber so that the local equivalence ratio in a late combustion stage is lower than the equivalence ratio at which soot is produced; and an intake air temperature controller for controlling the temperature of intake air after being mixed with exhaust gas and before being supplied into the combustion chamber within a temperature range lower than an upper temperature limit below which a predetermined ignition delay time can be secured after fuel injection of the fuel injection valve and higher than a lower temperature limit above which the production of HC and CO can be avoided.

2. The exhaust gas purifier of claim 1, wherein when the engine load is relatively high, the intake air temperature controller changes the upper and lower temperature limits to lower values than when the engine load is relatively low.

3. The exhaust gas purifier of claim 2, wherein as the engine load increases, the intake air temperature controller decreases the upper and lower temperature limits and makes the rate of decrease in the lower temperature limit to the engine load smaller than the rate of decrease in the upper temperature limit to the engine load.

4. The exhaust gas purifier of claim 1, wherein when the engine load is a predetermined value or more, the injection controller allows the fuel injection valve to provide a pilot injection of a predetermined amount of fuel at a predetermined injection timing prior to the fuel injection near the top dead center on the compression stroke.

5. The exhaust gas purifier of claim 4, wherein the injection controller controls the injection timing of the pilot injection within the range of crank angles later than a timing limit ahead of which fuel injected during the pilot injection is left unburned and earlier than a timing limit ahead of which a predetermined mixing time can be secured after the pilot injection.

6. The exhaust gas purifier of claim 4, wherein when the engine load is relatively high, the injection controller controls the amount of fuel injected during the pilot injection at a larger value than when the engine load is relatively low.

7. An engine exhaust gas purifier comprising:

an engine including at least one combustion chamber;

a fuel injection valve for injecting a predetermined amount of fuel into the combustion chamber near the top dead center on each compression stroke; and a control unit for controlling the amount of exhaust gas recirculated into the combustion chamber so that a locally high-temperature part of a combustion air-fuel mixture has a lower temperature than the temperature at which NOx is produced, controlling the excess air ratio in the combustion chamber so that the local equivalence ratio in a late combustion stage is lower than the equivalence ratio at which soot is produced, and controlling the temperature of intake air after being mixed with exhaust gas and before being supplied into the combustion chamber within a temperature range lower than an upper temperature limit below which a predetermined ignition delay time can be secured after the fuel injection and higher than a lower temperature limit above which the production of HC and CO can be avoided.

* * * * *